(12) United States Patent
Lin

(10) Patent No.: US 10,833,946 B2
(45) Date of Patent: Nov. 10, 2020

(54) ACTIVATION METHOD FOR BANDWIDTH PART AND RELATED PRODUCTS

(71) Applicant: GUANGDONG OPPO MOBILE TELECOMMUNICATIONS CORP., LTD., Dongguan, Guangdong (CN)

(72) Inventor: Ya'nan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/288,561

(22) Filed: Feb. 28, 2019

(65) Prior Publication Data

US 2019/0199592 A1 Jun. 27, 2019

Related U.S. Application Data

(63) Continuation of application No. PCT/CN2017/101745, filed on Sep. 14, 2017.

(51) Int. Cl.
*H04L 12/24* (2006.01)
*H04W 72/12* (2009.01)
(Continued)

(52) U.S. Cl.
CPC ........ *H04L 41/0896* (2013.01); *H04L 5/0098* (2013.01); *H04W 72/1289* (2013.01); *H04W 72/0453* (2013.01); *H04W 76/27* (2018.02)

(58) Field of Classification Search
CPC . H04L 41/0896; H04L 5/0091; H04L 5/0098; H04W 72/0453; H04W 72/1289; H04W 76/27
See application file for complete search history.

(56) References Cited

U.S. PATENT DOCUMENTS

2018/0063835 A1* 3/2018 Abedini ............... H04W 24/02
2018/0367386 A1* 12/2018 Liao .................... H04L 5/0092
(Continued)

FOREIGN PATENT DOCUMENTS

CN 102378296 A 3/2012
CN 102149208 B 11/2013
(Continued)

OTHER PUBLICATIONS

Corresponding extended European search report dated Aug. 19, 2019.
(Continued)

*Primary Examiner* — Steven H Nguyen

(57) ABSTRACT

The embodiment of the present application discloses an activation method for a BWP and related products, including: a terminal receives a first downlink control signaling DCI, the first DCI is used by a scheduling terminal to transmit uplink data through a physical uplink shared channel PUSCH in a target time unit; the terminal receives a second DCI, and the feedback response information of the second DCI is transmitted in the target time unit, and the transmitting time of the second DCI is before the target time unit or the same as the target time unit; the terminal determines, according to the transmitting time of the second DCI, the feedback response information for the transmission of the second DCI through the PUSCH in the target time unit. The embodiment of the present application is beneficial to improvement of both the accuracy and reliability of data scheduling in a communication system.

18 Claims, 5 Drawing Sheets

Network device

Terminal

(51) Int. Cl.
  *H04L 5/00* (2006.01)
  *H04W 76/27* (2018.01)
  *H04W 72/04* (2009.01)

(56) References Cited

U.S. PATENT DOCUMENTS

| | | | |
|---|---|---|---|
| 2019/0036673 A1* | 1/2019 | Chen | H04L 5/0098 |
| 2019/0045549 A1* | 2/2019 | Wu | H04W 72/085 |
| 2019/0045571 A1* | 2/2019 | Wu | H04L 5/0048 |
| 2019/0053103 A1* | 2/2019 | Manolakos | H04L 5/0048 |
| 2019/0208482 A1* | 7/2019 | Tooher | H04L 5/0055 |

FOREIGN PATENT DOCUMENTS

| | | | |
|---|---|---|---|
| CN | 106255215 A | 12/2016 | |
| CN | 106304199 A | 1/2017 | |
| EP | 2493240 A1 | 8/2012 | |
| WO | 2013075507 A1 | 5/2013 | |
| WO | WO-2019019893 A1 * | 1/2019 | H04L 5/00 |
| WO | WO-2019029414 A1 * | 2/2019 | H04W 72/04 |
| WO | WO-2019029519 A1 * | 2/2019 | H04W 72/04 |
| WO | WO-2019049282 A1 * | 3/2019 | H04W 72/04 |

OTHER PUBLICATIONS

"CA and BWP", R1-1716440-CA-BWP, 3rd Generation Partnership Project (3GPP); vol. RAN WG1, No. Nagoya, Japan; Sep. 18, 2017-Sep. 21, 2017; Sep. 12, 2017 (Sep. 12, 2017).

"Bandwidth part activation and adaptation" R1-1715571, 3GD Generation Partnership Project (3GPP); vol. RAN WG1, No. Nagoya, Japan; Sep. 18, 2017-Sep. 21, 2017; Sep. 11, 2017 (Sep. 11, 2017).

"Overview of bandwidth part, CA, and DC operation including SRS switching"; R1-1715425, 3GD Generation Partnership Project (3GPP); vol. RAN WG1, No. Nagoya, Japan; Sep. 18, 2017-Sep. 21, 2017; Sep. 11, 2017 (Sep. 11, 2017).

Guangdong Oppo Mobile Telecom; "R1-1710171 Bandwidth part based resource scheduling for carrier aggregation", 3GPP TSG RAN WG1 NR ad-Hoc#2, Qingdao, P.R. China Jun. 27-30, 2017, 3 pages.

Guangdong Oppo Mobile Telecom; "R1-1710164 Bandwidth part configuration and frequency resource allocation", 3GPP TSG RAN WG1 NR Ad-Hoc#2 Qingdao, P.R. China Jun. 27-30, 2017, 6 pages.

Interdigital et al: "Remaining details of BEP", 3GPP; R1-1716258; vol. RAN WG1, No. Nagoya, Japan; Sep. 18, 2017-Sep. 21, 2017; Sep. 11, 2017; XP051329334.

First EPO Office Action dated Feb. 13, 2020; Appln. No. 17922065.2.

The First Chinese Office Action dated Dec. 23, 2019; Appln. No. 201780050786.X.

The Second Office Action of corresponding Chinese application No. 201780050786.X, dated Mar. 27, 2020.

* cited by examiner

ACTIVATION METHOD FOR BANDWIDTH PART AND RELATED PRODUCTS

CROSS-REFERENCE TO RELATED APPLICATIONS

This application is a continuation of International Application No. PCT/CN2017/101745, filed on Sep. 14, 2017, entitled "ACTIVATION METHOD FOR BANDWIDTH PART AND RELATED PRODUCTS", the content of which is incorporated herein by reference in its entirety.

TECHNICAL FIELD

The present application relates to the field of communication technologies, and in particular, to an activation method for a bandwidth part (BWP) and related products.

BACKGROUND

The 5th-Generation of mobile communication technology (5G) New Radio (NR) is a newly proposed topic in the 3rd Generation Partnership Project (3GPP) organization. As the new generation of 5G technology is further discussed, on the one hand, since the communication system is backward compatible, the new technology developed later tends to the technology that has been standardized before undergoing compatibility; on the other hand, since there are a large number of existing designs in the 4th generation mobile communication (4G) technology Long Term Evolution (LTE) system, for achieving compatibility, flexibility of 5G will be seriously affected, thus reducing its performance. Therefore, at present, 3GPP organization is conducting parallel studies in two directions, where a technology discussion group that does not consider backward compatibility is called 5G NR.

In the research process of the 5G NR system, the system bandwidth supported by the 5G NR system is much larger than maximum system bandwidth of 20 MHz of LTE. For some terminals, not all system bandwidths can be supported due to limited capacity, and the concept of the Bandwidth Part (BWP) is introduced in the 5G NR system and in order to improve scheduling efficiency. In RRC connection state, a network device may configure one or more BWPs for the terminal, where the BWP mainly includes three parameters: a numerology, which is used to indicate subcarrier spacing (SCS); a center frequency point; and a bandwidth, which is less than or equal to the maximum system bandwidth. In other words, the BWP is a concept of a frequency domain dimension. At the same time, it is assumed that the existing discussion is at one point in time, and the terminal only supports one activated BWP. The so-called activation means that the terminal expects to transmit signals on a bandwidth specified by the BWP, including data transmission (uplink and downlink), system messages and such.

SUMMARY

The embodiment of the present application provides an activation method for bandwidth part (BWP) and related products, so as to achieve that terminal and the network device have consistent understanding of BWP that is actually used, and ensure the accuracy and stability of data scheduling of the communication system.

In a first aspect, the embodiment of the present application provides an activation method for bandwidth part (BWP), including:

receiving, by a terminal, first information from a network device on the first BWP in the first time unit, where the first information is used to activate a second BWP;

transmitting, by the terminal, feedback response information corresponding to the first information in a second time unit;

determining, by the terminal, a BWP that is activated after the second time unit.

In a second aspect, the embodiment of the present application provides an activation method for bandwidth part (BWP), including:

transmitting, by a network device, first information on a first BWP in a first time unit, where the first information is used to instruct a terminal to activate a second BWP;

receiving, by the network device, feedback response information corresponding to the first information in a second time unit;

determining, by the network device, a BWP that is activated after the second time unit according to the feedback response information.

In a third aspect, the embodiment of the present application provides a terminal, the terminal has a function of implementing a behavior of a terminal in the above method designs. The functions may be implemented by hardware or by the way the hardware executing corresponding software. The hardware or software includes one or more modules corresponding to the functions described above. In a possible design, the terminal includes a processor configured to support the terminal to perform corresponding functions of the methods described above. Further, the terminal may further include a transceiver configured to support communication between the terminal and the network device. Further, the terminal may further include a memory configured to couple with the processor, and the memory stores program instructions and data necessary for the terminal.

In a fourth aspect, the embodiment of the present application provides a network device, the network device has a function of implementing a behavior of a network device in the above method designs. The functions may be implemented by hardware or by the way the hardware executing corresponding software. The hardware or software includes one or more modules corresponding to the functions described above. In a possible design, the network device includes a processor configured to support the network device to perform corresponding functions of the methods described above. Further, the network device may further include a transceiver configured to support communication between the network device and the terminal. Further, the network device may also include a memory configured to couple with the processor, and the memory stores program instructions and data necessary for the network device.

In a fifth aspect, the embodiment of the present application provides a terminal, including a processor, a memory, a communication interface, and one or more programs, where the one or more programs are stored in the memory, and configured to be executed by the processor, and the one or more programs comprises instructions for performing steps in any of the methods according to the first aspect of the embodiment of the present application.

In a sixth aspect, the embodiment of the present application provides a network device, including a processor, a memory, a transceiver, and one or more programs, where the one or more programs are stored in the memory, and are configured to be executed by the processor, the one or more programs comprises instructions for performing steps in any of the methods according to the second aspect of the embodiment of the present application.

In a seventh aspect, the embodiment of the present application provides a computer readable storage medium, where the computer readable storage medium stores a computer program for electronic data exchange, where the computer program enables a computer to perform some or all of the steps described in any of the methods according to the first aspect of the embodiment of the present application.

In an eighth aspect, the embodiment of the present application provides a computer readable storage medium, where the computer readable storage medium stores a computer program for electronic data exchange, where the computer program enables a computer to perform some or all of the steps described in any of the methods according to the second aspect of the embodiment of the present application.

In a ninth aspect, the embodiment of the present application provides a computer program product, where the computer program product includes a non-transitory computer readable storage medium storing a computer program, the computer program can be operated to enable a computer to perform some or all of the steps described in any of the methods according to the first aspect of the embodiment of the present application. The computer program product may be a software installation package.

In a tenth aspect, the embodiment of the present application provide a computer program product, where the computer program product includes a non-transitory computer readable storage medium storing a computer program, the computer program can be operated to enable a computer to perform some or all of the steps described in any of the methods according to the second aspect of the embodiment of the present application. The computer program product may be a software installation package.

It can be seen that, in the embodiment of the present application, a terminal receives first information from a network device on a first BWP in a first time unit, where the first information is used to activate a second BWP; then, the terminal transmits feedback response information corresponding to the first information in the second time unit; and finally, the terminal determines the BWP that is activated after the second time unit. It can be seen that, according to the feedback response information corresponding to the first information, the network device can know whether the terminal correctly receives the first information indicating that the second BWP is activated, so as to determine the BWP that is actually activated after the second time unit, so that the terminal and the network side device both can accurately know the actual activated BWP, avoid transmission interruption during BWP activation, and ensure the transmission reliability.

BRIEF DESCRIPTION OF THE DRAWINGS

The appended drawings required in description of embodiments or the prior art will be briefly described below.

DESCRIPTION OF EMBODIMENTS

First, some concepts and general operation methods involved in the embodiment of the application will be briefly described.

In the current discussion of BWP in the 5G NR system, the network device can switch between different BWPs configured by the terminal by transmitting an instruction, that is, deactivate the current BWP and activate a new BWP. The activation instruction may be in the following manners: RRC dedicated signaling; DCI or media access control (MAC) control element (CE); time pattern: that is, switch between different BWPs according to a certain time schedule. Currently, there is no clear plan for the specific operating method of BWP activation.

For the above problem, the embodiment of the present application proposes an activation method for a bandwidth part (BWP) and related products. The method includes: the terminal receives first information from a network device on a first BWP in a first time unit, where the first information is used to activate a second BWP; then, the terminal transmits feedback response information corresponding to the first information in the second time unit; and finally, the terminal determines the BWP that is activated after the second time unit. It can be seen that, according to the feedback response information corresponding to the first information, the network device can know whether the terminal correctly receives the first information that indicating to activate the second BWP, so as to determine the BWP that is actually activated after the second time unit, so that the terminal and the network side device both can accurately know the actual activated BWP, avoid transmission interruption during BWP activation, and ensure the transmission reliability.

The technical solution in the embodiment of the present application will be described below with reference to the appended drawings.

Figure 1:
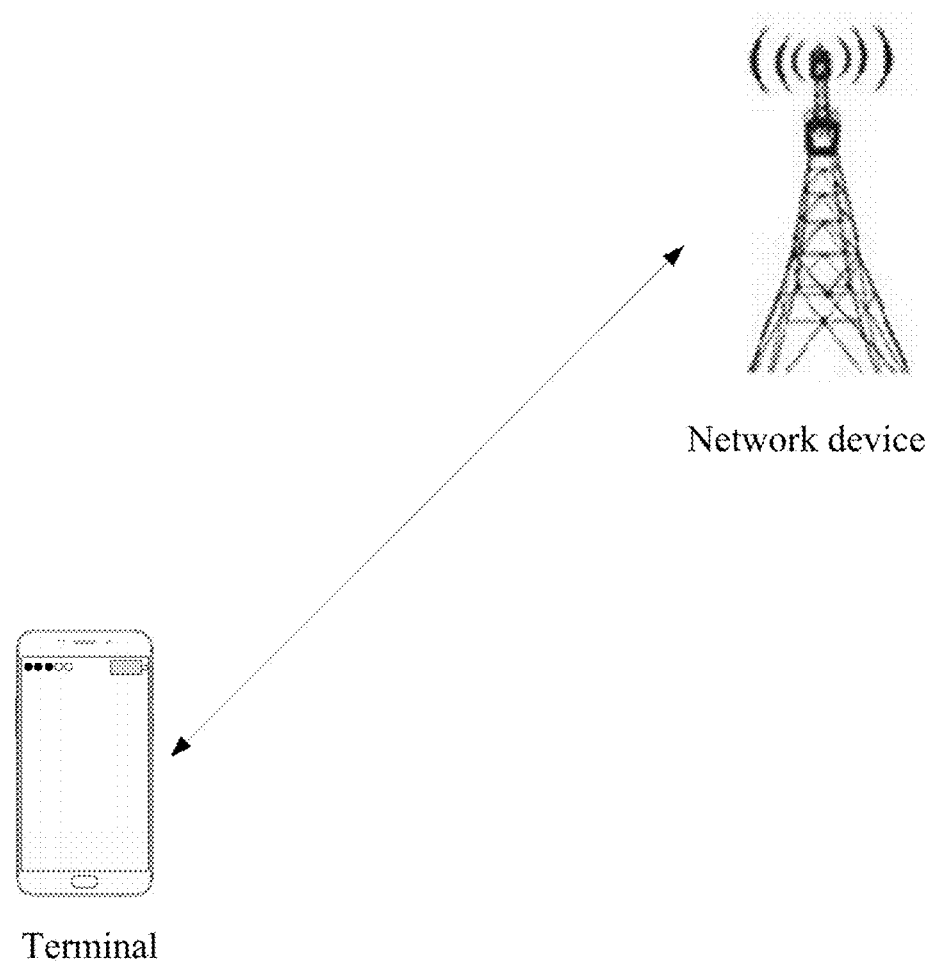
FIG. 1 is a network architecture diagram of a possible communication system according to an embodiment of the present application.

Referring to FIG. 1, FIG. 1 is possible network architecture of an example communication system according to an embodiment of the present application. The example communication system can be, for example, a 5G NR system and other such communication systems. The example communication system specifically includes a network device and a terminal. When the terminal accesses the mobile communication network provided by the network device, the terminal and the network device can communicate with each other and be connected through a wireless link, and the communication connection mode can be a single connection mode or a dual connection mode. When the communication connection mode is a single connection mode, the network device may be a LTE base station or a NR base station (also referred to as a gNB base station), and when the communication mode is a dual connection mode (may be specifically implemented by the carrier aggregation (CA) technology, or by a plurality of network devices), and the terminal is connected to multiple network devices, the plurality of network devices may be the primary base station MCG and the secondary base station SCG, and data backhaul among the base stations is performed through the backhaul link. The primary base station may be a LTE base station, the secondary base station may be a LTE base station, or, the primary base station may be an NR base station, the secondary base station may be a LTE base station, or the primary base station may be an NR base station, and the secondary base station may be an NR base station.

In the embodiment of the present application, nouns "network" and "system" are often used interchangeably, and those skilled in the art can understand the meaning thereof. The terminal involved in the embodiment of the present application may include various handheld devices, vehicle-mounted devices, wearable devices, computing devices, all of which have the wireless communication function, or other processing devices connected to the wireless modem, and various forms of user equipment (UE), mobile stations (MS), terminal devices and such. Devices described above are collectively referred to as terminals for ease of description.

Figure 2:
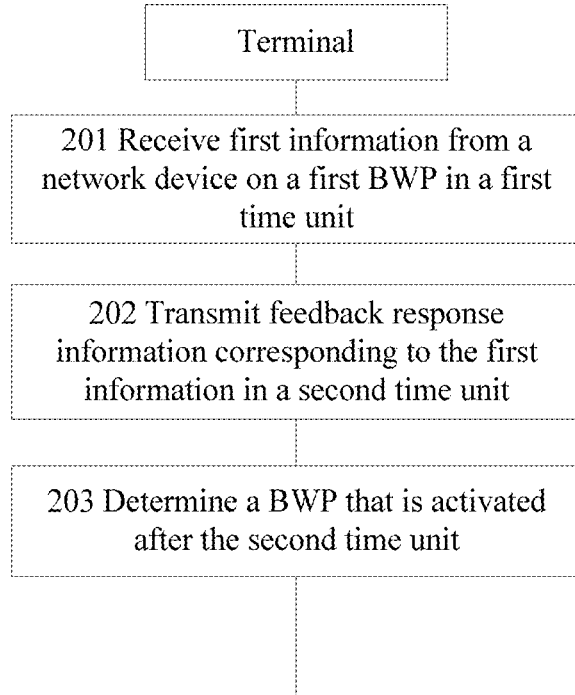
FIG. 2 is a schematic flowchart of an activation method for a bandwidth part (BWP) according to an embodiment of the present application.

Referring to FIG. 2, FIG. 2 is an activation method for a bandwidth part (BWP) according to an embodiment of the present application, which is applied to the above example communication system, and the method includes:

In section 201, the terminal receives first information from a network device on a first BWP in a first time unit, the first information is used to activate a second BWP.

Where the time unit may be a time domain unit such as a subframe, a time slot, and a symbol.

In section 202, the terminal transmits the feedback response information corresponding to the first information in a second time unit.

Where the feedback response information includes acknowledgement (ACK)/non-acknowledgment (NACK) information.

In section 203, the terminal determines a BWP that is activated after the second time unit.

It can be seen that, in the embodiment of the present application, the terminal receives a first information from a network device on a first BWP in a first time unit, and the first information is used to activate a second BWP; then, the terminal transmits feedback response information corresponding to the first information in a second time unit; and finally, the terminal determines a BWP that is activated after the second time unit. It can be seen that, according to the feedback response information corresponding to the first information, the network device can know whether the terminal correctly receives the first information that indicating to activate the second BWP, so as to determine the BWP that is actually activated after the second time unit, so that the terminal and the network side device both can accurately know the actual activated BWP, avoid transmission interruption during BWP activation, and ensure the transmission reliability.

In a possible example, the terminal transmits feedback response information corresponding to the first information in the second time unit, including: the terminal transmits the feedback response information on the first BWP in the second time unit.

It can be seen that, in this example, when the first BWP supports both the uplink transmission and the downlink transmission, the terminal can directly transmit the feedback response information on the first BWP, and does not need to wait for the handover to a new BWP to perform transmission, and the feedback delay is shorter.

In a possible example, the terminal transmits feedback response information corresponding to the first information in the second time unit, including: the terminal transmits the feedback response information on the second BWP in the second time unit.

It can be seen that, in this example, the terminal can transmit feedback response information on the second BWP after the second BWP is activated, and the terminal completes the BWP handover before transmitting the feedback information, and can directly perform data transmission on a new BWP after transmitting the feedback information, so as to perform data transmission quickly.

In a possible example, the terminal transmits feedback response information corresponding to the first information in the second time unit, including: the terminal transmits the feedback response information on a third BWP in the second time unit, a downlink operation of the terminal in the first time unit is on the first BWP, and an uplink operation of the terminal in the first time unit is on the third BWP.

It can be seen that, in this example, the downlink operation of the current terminal is on the first BWP, the uplink operation is on the third BWP, the terminal can directly transmit the feedback information on the third BWP, does not need to wait for the handover to a new BWP to perform transmission, and the feedback delay is shorter.

In a possible example, the terminal transmits feedback response information corresponding to the first information in the second time unit, including: the terminal transmits the feedback response information on the fourth BWP in the second time unit, the second BWP is a full downlink resource, and the fourth BWP is an uplink resource paired with the second BWP.

It can be seen that, in this example, the downlink operation of the terminal is on the second BWP in the second time unit, the uplink operation is on the fourth BWP, the terminal can directly transmit the feedback response information on the fourth BWP after activating the second BWP, and can directly perform data transmission on a new BWP after transmitting the feedback information, so as to perform data transmission quickly.

In a possible example, the terminal transmits feedback response information corresponding to the first information in the second time unit, including: the terminal transmits the feedback response information on a fifth BWP in the second time unit, and the fifth BWP is used to transmit feedback response information transmitted by the terminal.

It can be seen that, in this example, the fifth BWP resources are specifically used for transmitting feedback response information, and improving the reliability of the feedback response information transmission.

In this possible example, before the terminal determines to transmit feedback response information corresponding to the first information in the second time unit, the method further includes: the terminal receives the first configuration information from the network device; the terminal determines a BWP that transmits the feedback response information according to the first configuration information.

It can be seen that, in this example, the first configuration information can be used to indicate the BWP that transmits the feedback response information, so that the terminal and the network device have consistent understanding of BWP that transmits the feedback response information, and ensure the reliability of the feedback response information transmission.

In a possible example, the terminal determines the BWP that is activated after the second time unit, including: the terminal correctly receives the first information, and determines to perform data reception and/or transmission on the second BWP after a target time period starting from the second time unit.

It can be seen that, in this example, if the terminal determines that the first information is correctly received, and transmits feedback response information corresponding to the first information to a network device in the second time unit, it determines that the second BWP is activated after a target time period starting from the second time unit, and data transmission is performed on the second BWP, that is, a solution for accurately determining a time to activate the second BWP based on the result of correctly receiving the first information is proposed, so that the data transmission reliability and response efficiency can be improved.

In this possible example, the duration of the target time period is configured by the network device; or the duration of the target time period is reported by the terminal; or the duration of the target time period is stipulated by the first preset protocol.

In this possible example, the feedback response information is transmitted on the second BWP or on the fourth BWP, and the duration of the target time period is zero.

In a possible example, the terminal determines the BWP that is activated after the second time unit, including: the terminal incorrectly receives the first information, and determines to perform data reception and/or transmission on a previously operating BWP after the second time unit, where the previously operating BWP is a BWP operating in the first time unit.

The previously operating BWP may be the first BWP and/or the third BWP.

It can be seen that, in this example, if the terminal determines that the first information is not correctly received, the terminal does not know the activation information transmitted by the network device, and thus continues to operate on the original operating BWP to ensure the reliability and success rate of the feedback response information transmission.

In a possible example, before the terminal determines to transmit the feedback response information corresponding to the first information in the second time unit, the method further includes: the terminal receives the second configuration information from the network device; and the terminal determines the second time unit according to the second configuration information; or the terminal determines the second time unit according to a second preset protocol.

It can be seen that, in this example, the second configuration information can accurately indicate the second time unit for transmitting the feedback response information corresponding to the first information, so that the terminal and the network device have consistent understanding of BWP that transmits the feedback response information, and ensure the reliability of the feedback response information transmission.

In a possible example, the feedback response information is transmitted through an independent uplink control channel.

That is, when the feedback response information corresponding to other downlink data in the second time unit needs to be transmitted, the feedback response information corresponding to the first information is not multiplexed with the feedback response information corresponding to other data onto the same physical channel.

In a possible example, the first information is transmitted through a downlink control channel; and/or the first information is transmitted through a downlink shared channel.

Figure 3:
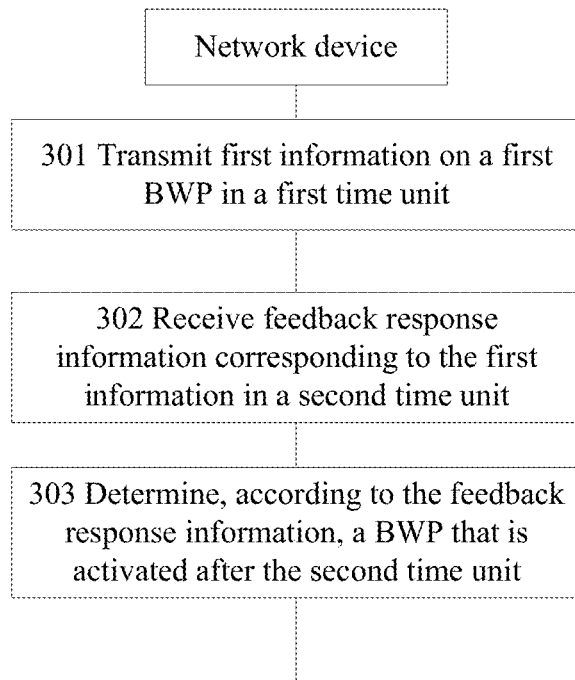
FIG. 3 is a schematic flowchart of another activation method for a bandwidth part (BWP) according to an embodiment of the present application.

Consistent with the embodiment shown in FIG. 2, referring to FIG. 3, FIG. 3 is an activation method for a bandwidth part (BWP) according to an embodiment of the present application. The method is applied to the above example communication system, and the method includes:

In section 301, the network device transmits first information on a first BWP in a first time unit, and the first information is used to instruct a terminal to activate a second BWP.

In section 302, the network device receives feedback response information corresponding to the first information in a second time unit.

In section 303, the network device determines, according to the feedback response information, a BWP that is activated after the second time unit.

It can be seen that, in the embodiment of the present application, the network device first transmits the first information on the first BWP in the first time unit, and the first information is used to instruct the terminal to activate a second BWP; then, the network device receives the feedback response information corresponding to the first information in the second time unit; and finally, the network device determines the BWP that is activated after the second time unit according to the feedback response information. It can be seen that, according to the feedback response information corresponding to the first information, the network device can know whether the terminal correctly receives the first information instructing to activate a second BWP, so as to determine the BWP that is actually activated after the second time unit, so that the terminal and the network side device both can accurately know the actual activated BWP, avoid transmission interruption during BWP activation, and ensure the transmission reliability.

In this possible example, the feedback response information is transmitted on the first BWP; or the feedback response information is transmitted on the second BWP; or the feedback response information is transmitted on a third BWP, where a downlink operation of the terminal in the first time unit is on the first BWP, and an uplink operation of the terminal in the first time unit is on the third BWP; or, the feedback response information is transmitted on a fourth BWP, the second BWP is a full downlink resource, the fourth BWP is an uplink resource paired with the second BWP, or the feedback response information is transmitted on a fifth BWP, and the fifth BWP is configured to transmit the feedback response information transmitted by the terminal.

In this possible example, before the network device receives the feedback response information in the second time unit, the method further includes: the network device transmits first configuration information, and the first configuration information is used to instruct the terminal to determine, according to the first configuration information, a BWP that transmits the feedback response information.

In a possible example, the network device determines the BWP that is activated after the second time unit according to the feedback response information, including: the network device determines that the received feedback response information is acknowledgement feedback response information, and determines to perform data reception and/or transmission on the second BWP after a target time period starting from the second time unit.

In this possible example, the duration of the target time period is configured by the network device; or the duration of the target time period is reported by the terminal; or the duration of the target time period is stipulated by the first preset protocol.

In this possible example, the acknowledgement feedback response information is transmitted on the second BWP or on the fourth BWP, and the value of the duration of the target time period is zero.

In a possible example, the terminal determines the BWP that is activated after the second time unit according to the feedback response information, including: the network device determines that the received feedback response information is non-acknowledgment feedback response information or the feedback response information is not received, and determines to perform data reception and/or transmission on the first BWP after the second time unit.

In a possible example, before the network device receives the feedback response information ill the second time unit, the method further includes: the network device transmits second configuration information, the second configuration information is used by the terminal to determine the second time unit; or, the network device determines the second time unit according to a second preset protocol.

In a possible example, the feedback response information is transmitted through an independent uplink control channel.

In a possible example, the first information is transmitted through a downlink control channel; and/or the first information is transmitted through a downlink shared channel.

Figure 4:
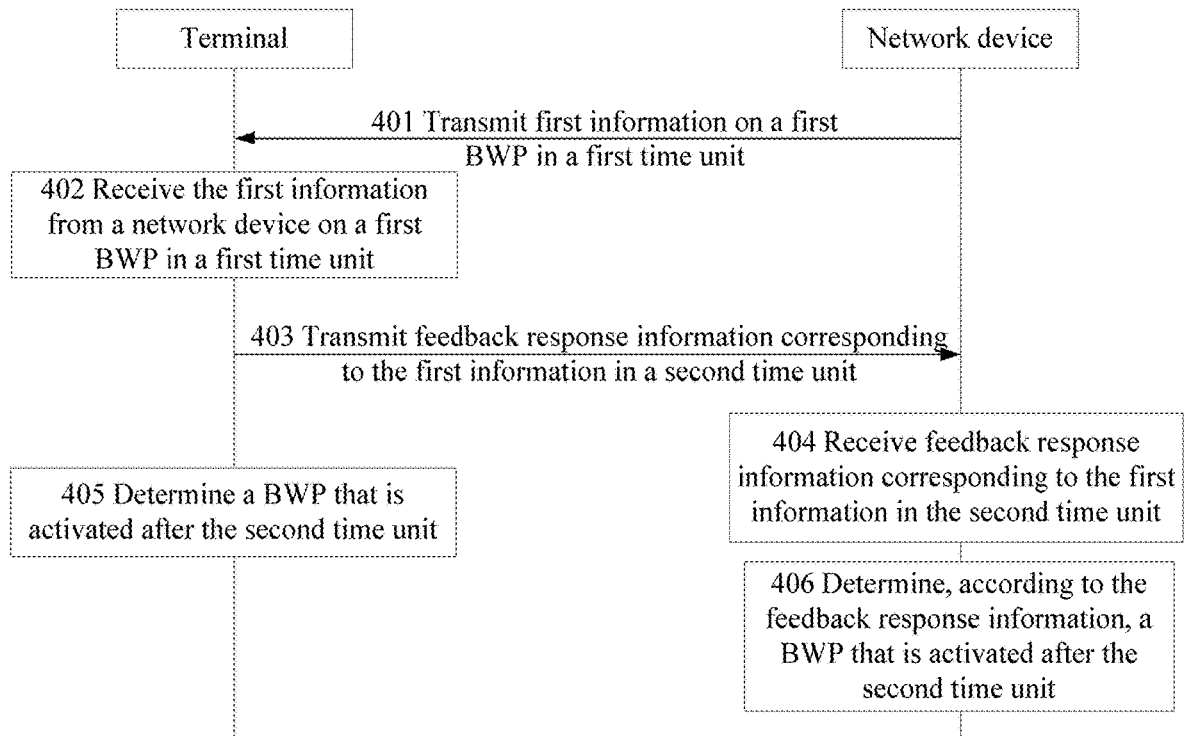
FIG. 4 is a schematic flowchart of another activation method for a bandwidth part (BWP) according to an embodiment of the present application.

Consistent with the embodiments shown ill FIG. 2 and FIG. 3, referring to FIG. 4, FIG. 4 is an activation method for a bandwidth part (BWP) according to an embodiment of the present application. The method is applied to the above example communication system, and the method includes:

In section 401, the network device transmits first information on a first BWP in a first time unit, and the first information is used to instruct a terminal to activate a second BWP.

In section 402, the terminal receives first information from a network device on a first BWP in a first time unit, and the first information is used to activate a second BWP.

In section 403, the terminal transmits feedback response information corresponding to the first information in a second time unit.

In section 404, the network device receives feedback response information corresponding to the first information in the second time unit.

In section 405, the terminal determines a BWP that is activated after the second time unit.

In section 406, the network device determines, according to the feedback response information, a BWP that is activated after the second time unit.

It can be seen that, in this embodiment of the present application, the terminal receives first information from the network device on the first BWP in the first time unit, and the first information is used to activate the second BWP; then, the terminal transmits feedback response information corresponding to the first information in the second time unit; and finally, the terminal determines the BWP that is activated after the second time unit. It can be seen that, according to the feedback response information corresponding to the first information, the network device can know whether the terminal correctly receives the first information indicating that the second BWP is activated, so as to determine the BWP that is actually activated after the second time unit, so that the terminal and the network side device both can accurately know the actual activated BWP, avoid transmission interruption during BWP activation, and ensure the transmission reliability.

Figure 5:
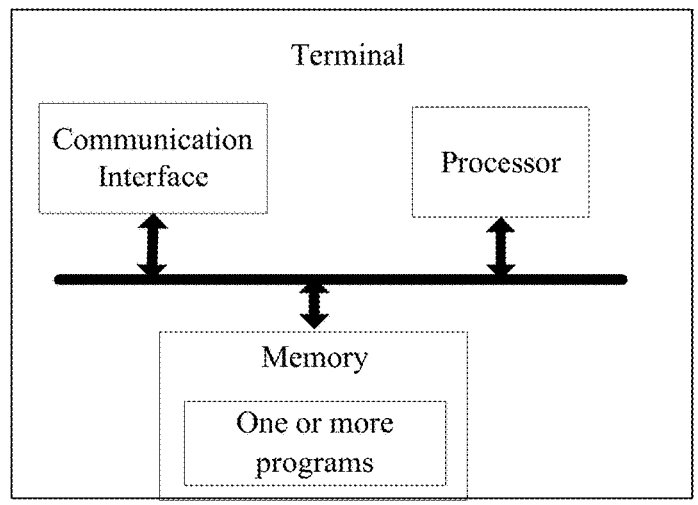
FIG. 5 is a schematic structural diagram of a terminal according to an embodiment of the present application.

Consistent with above embodiments, referring to FIG. 5, FIG. 5 is a schematic structural diagram of a terminal according to an embodiment of the present application. As shown in the figure, the terminal includes a processor, a memory, a communication interface, and one or more programs, wherein the one or more programs are stored in the memory, and configured to be executed by the processor, and the one or more programs includes instructions for performing the following steps;

receive first information from a network device on a first BWP in a first time unit, where the first information is used to activate a second BWP;

transmit feedback response information corresponding to the first information in a second time unit;

determine a BWP that is activated after the second time unit.

It can be seen that, in the embodiment of the present application, the terminal receives the first information from the network device on the first BWP in the first time unit, where the first information is used to activate the second BWP; then, the terminal transmits feedback response information corresponding to the first information in the second time unit; and finally, the terminal determines the BWP that is activated after the second time unit. It can be seen that, according to the feedback response information corresponding to the first information, the network device can know whether the terminal correctly receives the first information indicating that the second BWP is activated, so as to determine the BWP that is actually activated after the second time unit, so that the terminal and the network side device both can accurately know the actual activated BWP, avoid transmission interruption during BWP activation, and ensure the transmission reliability.

In a possible example, in terms of transmitting the feedback response information corresponding to the first information in the second time unit, the instruction in the program is specifically configured to perform following operations: transmit the feedback response information on the first BWP in the second time unit; or transmit the feedback response information on the second BWP in the second time unit; or transmit the feedback response information on the third BWP in the second time unit, where a downlink operation of the terminal in the first time unit is on the first BWP, and an uplink operation of the terminal in the first time unit is on the third BWP; or the terminal transmits the feedback response information on the fourth BWP in the second time unit, the second BWP is a full downlink resource, and the fourth BWP is an uplink resource paired with the second BWP; or the terminal transmits the feedback response information on the fifth BWP in the second time unit, the fifth BWP is used to transmit the feedback response information transmitted by the terminal.

In a possible example, the program further includes instructions for performing following operations: receive first configuration information from the network device before determining to transmit feedback response information corresponding to the first information in a second time unit; and determine a BWP for transmitting the feedback response information according to the first configuration information.

In a possible example, in terms of determining the BWP that is activated after the second time unit, the instruction in the program is specifically configured to perform following operations: correctly receive the first information, determine to perform data reception and/or transmission on the second BWP after the target time period starting from the second time unit.

In this possible example, the duration of the target time period is configured by the network device; or, the duration of the target time period is reported by the terminal; or, the duration of the target time period is stipulated by the first preset protocol.

In a possible example, the feedback response information is transmitted on the second BWP or the fourth BWP, and the duration of the target time period is zero.

In a possible example, in terms of determining the BWP that is activated after the second time unit, the instruction in the program is specifically configured to perform following operations: incorrectly receive the first information, and determines to perform data reception and/or transmission on a previously operating BWP after the second time unit, and the previously operating BWP is a BWP operating in the first time unit.

In a possible example, the program further includes instructions to perform following operations: receive a second configuration information from the network device before determining to transmit feedback response information corresponding to the first information in a second time unit; and determine the second time unit according to the second configuration information; or determine the second time unit according to a second preset protocol.

In a possible example, the feedback response information is transmitted through an independent uplink control channel.

In a possible example, the first information is transmitted through a downlink control channel; and/or the first information is transmitted through a downlink shared channel.

Figure 6:
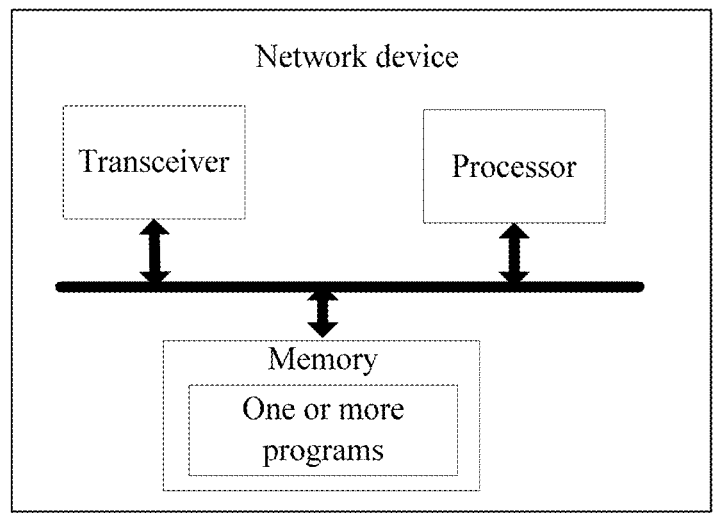
FIG. 6 is a schematic structural diagram of a network device according to an embodiment of the present application.

Consistent with above embodiments, referring to FIG. 6, FIG. 6 is a schematic structural diagram of a network device according to an embodiment of the present application. As shown in the figure, the network device includes a processor, a memory, a transceiver, and one or more programs, where the one or more programs are stored in the memory and configured to be executed by the processor, and the one or more programs includes instructions for performing the following steps;

transmit the first information on the first BWP in the first time unit, where the first information is used to instruct a terminal to activate a second BWP;

receive feedback response information corresponding to the first information in a second time unit;

determine a BWP that is activated after the second time unit according to the feedback response information.

It can be seen that, in the embodiment of the present application, the network device first transmits the first information on the first BWP in the first time unit, and the first information is used to indicates that the terminal activates the second BWP; then, receives feedback response information corresponding to the first information in the second time unit; and finally, determines the BWP that is activated after the second time unit according to the feedback response information. It can be seen that, according to the feedback response information corresponding to the first information, the network device can know whether the terminal correctly receives the first information indicating that the second BWP is activated, so as to determine the BWP that is actually activated after the second time unit, so that the terminal and the network side device both can accurately know the actual activated BWP, avoid transmission interruption during BWP activation, and ensure the transmission reliability.

In a possible example, the feedback response information is transmitted on the first BWP; or the feedback response information is transmitted on the second BWP; or the feedback response information is transmitted on a third BWP, where a downlink operation of the terminal in the first time unit is on the first BWP, and an uplink operation of the terminal in the first time unit is on the third BWP; or, the feedback response information is transmitted on a fourth BWP, the second BWP is a full downlink resource, and the fourth BWP is an uplink resource paired with the second BWP; or the feedback response information is transmitted on a fifth BWP, and the fifth BWP is configured to transmit the feedback response information transmitted by the terminal.

In a possible example, the program further includes instructions for performing following operations: transmit a first configuration information from the network device before determining to transmit feedback response information corresponding to the first information in a second time unit, where the first configuration information is used to instruct the terminal to determine, according to the first configuration information, a BWP that transmits the feedback response information.

In a possible example, in terms of the determining, according to the first configuration information, a BWP that transmits the feedback response information, the instruction in the program is specifically configured to perform following operations: determine that the received feedback response information is acknowledgement feedback response information, and determine to perform data reception and/or transmission on the second BWP after a target time period starting from the second time unit.

In this possible example, the duration of the target time period is configured by the network device; or the duration of the target time period is reported by the terminal; or the duration of the target time period is stipulated by a first preset protocol.

In this possible example, the acknowledgement feedback response information is transmitted on the second BWP or on the fourth BWP, and the value of the duration of the target time period is zero.

In a possible example, in terms of the determining the BWP that is activated after the second time unit according to the feedback response information, the instruction in the program is specifically configured to perform following operations: determine that the received feedback response information is non-acknowledgment feedback response information or the feedback response information is not received, and determine to perform data reception and/or transmission on the first BWP after the second time unit.

In a possible example, the program further includes instructions for performing the following steps: transmit second configuration information before receiving the feedback response information in a second time unit; and the second configuration information is used by the terminal to determine the second time unit; or, determine the second time unit according to a second preset protocol.

In a possible example, the feedback response information is transmitted through an independent uplink control channel.

In a possible example, the first information is transmitted through a downlink control channel; and/or the first information is transmitted through a downlink shared channel.

The above mainly introduces the solution of the embodiment of the present application from the perspective of interaction between various network elements. It can be understood that, in order to achieve the above functions, the user device and the network device include corresponding hardware structures and/or software modules used for performing each function. Those of ordinary skill in the art will appreciate that units and algorithm steps of each example described with reference to the embodiment disclosed herein can be implemented in hardware or a combination of hardware and computer software. Whether a certain function is executed in hardware or in the form that computer software drive's hardware, depends on the specific application and design constraints of the solution.

Professionals can use different methods for implementing the described functions for each specific application, but such implementation should not be considered to be beyond the scope of the present application.

The embodiment of the present application may perform functional unit division on the user device and the network side device according to the above method example. For example, each functional unit may be divided according to each function, or two or more functions may be integrated into one processing unit. The above integrated unit can be implemented in the form of hardware or in the form of a software program module. It should be noted that the division of the unit in the embodiments of the present application is illustrative and is only a logical function division, and there may be other division ways in actual implementation.

Figure 7:
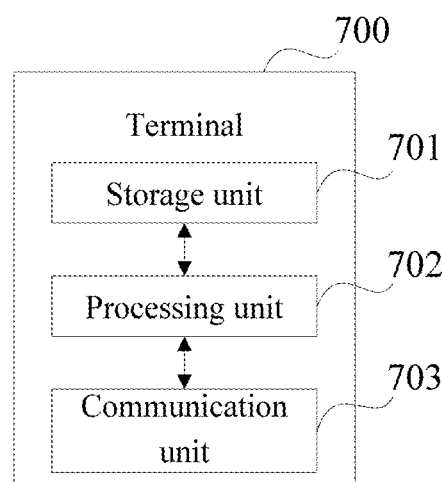
FIG. 7 is a structural block diagram of a functional unit of a terminal according to an embodiment of the present application.

In the case of employing an integrated unit, FIG. 7 illustrates a structural block diagram of a possible functional unit of the terminal involved in the above embodiments. A terminal 700 includes a processing unit 702 and a communication unit 703. The processing unit 702 is configured to control and manage actions of a terminal. For example, the processing unit 702 is configured to support the terminal to perform steps 201 to 203 in FIG. 2, steps 402, 403 to 405 in FIG. 4, and/or configured to be used for other processes of the technology described herein. The communication unit 703 is configured to support communication between the terminal and other devices, such as the communication with the network device shown in FIG. 6. The terminal may further include a storage unit 701 for storing program codes and data of the terminal.

Where the processing unit 702 may be a processor or a controller, and may be, for example, a central processing unit (CPU), a general processor, a digital signal processor (DSP), and an application-specific integrated circuit (ASIC), a field programmable gate array (FPGA) or other programmable logic devices, a transistor logic device, a hardware component, or any combination thereof. The processing unit 702 may implement or perform the various illustrative logical blocks, modules and circuits described with reference to the present disclosure. The processor may also be a combination for implementing the computing function, for example, a combination including one or more microprocessors, a combination of a DSP and a microprocessor and such. The communication unit 703 may be a transceiver, a transceiver circuit and such, and the storage unit 701 may be a memory.

Where the processing unit 702 is configured to receive, via the communication unit 703, first information from a network device on a first BWP in a first time unit, where the first information is used to activate a second BWP; the communication unit 703 transmits feedback response information corresponding to the first information in a second time unit;

and determines the BWP that is activated after the second time unit.

In a possible example, in terms of the transmitting feedback response information corresponding to the first information in a second time unit through the communication unit 703, the processing unit 702 is specifically configured to: transmit the feedback response information on the first BWP in the second time; or transmit the feedback response information on the second BWP in the second time; or transmit the feedback response information on a third BWP in the second time, where a downlink operation of the terminal in the first time unit is on the first BWP, and an uplink operation of the terminal in the first time unit is on the third BWP; or the terminal transmits the feedback response information on a fourth BWP in the second time unit, where the second BWP is a full downlink resource, and the fourth BWP is an uplink resource paired with the second BWP, or the terminal transmits the feedback response information on a fifth BWP, and the fifth BWP is configured to transmit the feedback response information transmitted by the terminal.

In a possible example, the processing unit 702 is further configured to: receive, through the communication unit 703, first configuration information from the network device before determining to transmit feedback response information corresponding to the first information in a second time unit; and determine a BWP for transmitting the feedback response information according to the first configuration information.

In a possible example, in terms of the determining the BWP that is activated after the second time unit, the processing unit 702 is specifically configured to: correctly receive the first information, determine to perform data reception and/or transmission on the second BWP after the target time period starting from the second time unit.

In a possible example, the duration of the target time period is configured by the network device; or the duration of the target time period is reported by the terminal; or the duration of the target time period is stipulated by the first preset protocol.

In a possible example, the feedback response information is transmitted on the second BWP or the fourth BWP, and the duration of the target time period is zero.

In a possible example, in terms of the determining the BWP that is activated after the second time unit, the processing unit 702 is specifically configured to: incorrectly receive the first information, and determines to perform data reception and/or transmission on a previously operating BWP after the second time unit, and the previously operating BWP is a BWP operating in the first time unit.

In a possible example, the processing unit 702 is further configured to: receive, through the communication unit 703, a second configuration information from the network device before determining to transmit feedback response information corresponding to the first information in a second time unit; and determine the second time unit according to the second configuration information; or determine the second time unit according to a second preset protocol.

In a possible example, the feedback response information is transmitted through an independent uplink control channel.

In a possible example, the first information is transmitted through a downlink control channel; and/or the first information is transmitted through a downlink shared channel.

When the processing unit 702 is a processor, the communication unit 703 is a communication interface, the storage unit 701 is a memory, and the terminal involved in the embodiment of the present application may be the terminal shown in FIG. 5.

Figure 8:
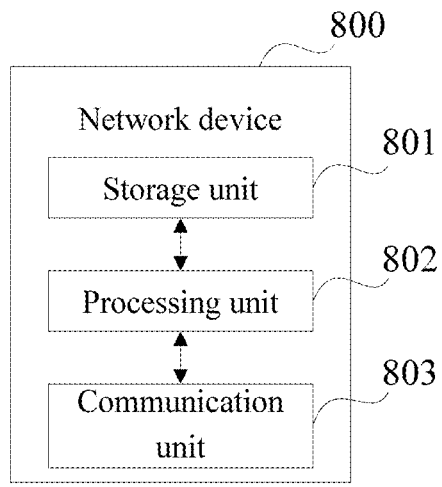
FIG. 8 is a structural block diagram of a functional unit of a network device according to an embodiment of the present disclosure.

In the case of employing an integrated unit, FIG. 8 illustrates a structural block diagram of a possible functional unit of the network device involved in the above embodiments. The network device 800 includes a processing unit 802 and a communication unit 803. The processing unit 802 is configured to control and manage actions of a network device. For example, the processing unit 802 is configured to support the network device to perform steps 301 to 303 in FIG. 3, 401, 404, 406 in FIG. 4, and/or configured to be used for other processes of the technology described herein. The communication unit 803 is configured to support communication between the terminal and other devices, such as the communication with the terminal shown in FIG. 5. The network device may further include a storage unit 801 for storing program codes and data of the network device.

Where the processing unit 802 may be a processor or a controller, the communication unit 803 may be a transceiver, a transceiver circuit, a radio frequency chip, etc., and the storage unit 801 may be a memory.

Where the processing unit 802 is configured to transmit, via the communication unit 803, the first information on the first BWP in the first time unit, and the first information is used to instruct a terminal to activate a second BWP; receive, through the communication unit 803, the feedback response information corresponding to the first information in the second time unit; and determine the BWP that is activated after the second time unit according to the feedback response information.

In a possible example, the feedback response information is transmitted on the first BWP; or the feedback response information is transmitted on the second BWP; or the feedback response information is transmitted on a third BWP, where a downlink operation of the terminal in the first time unit is on the first BWP, and an uplink operation of the terminal in the first time unit is on the third BWP; or, the feedback response information is transmitted on a fourth BWP, the second BWP is a full downlink resource, the fourth BWP is an uplink resource paired with the second BWP, or the feedback response information is transmitted on a fifth BWP, and the fifth BWP is configured to transmit the feedback response information transmitted by the terminal.

In a possible example, the processing unit 802 is further configured to: before receiving the feedback response information in the second time unit, the communication unit 803 transmits the first configuration information, where the first configuration information is used to instruct the terminal to determine, according to the first configuration information, a BWP that transmits the feedback response information.

In a possible example, in terms of the determining the BWP that is activated after the second time unit according to the feedback response information, the processing unit 802 is specifically configured to: determine that the received feedback response information is acknowledgement feedback response information, and determine to perform data reception and/or transmission on the second BWP after a target time period starting from the second time unit.

In a possible example, the duration of the target time period is configured by the network device; or the duration of the target time period is reported by the terminal; or the duration of the target time period is stipulated by the first preset protocol.

In a possible example, the feedback response information is transmitted on the second BWP or on the fourth BWP, and the value of the duration of the target time period is zero.

In a possible example, in terms of determining the BWP that is activated after the second time unit according to the feedback response information, the processing unit 802 is specifically configured to: determine that the received feedback response information is non-acknowledgment feedback response information or the feedback response information is not received, and determine to perform data reception and/or transmission on the first BWP after the second time unit.

In a possible example, the processing unit 802 is further configured to: before receiving the feedback response information in the second time unit, transmit, through the communication unit 803, second configuration information, the second configuration information is used by the terminal to determine the second time unit; or, determine the second time unit according to a second preset protocol.

In a possible example, the feedback response information is transmitted through an independent uplink control channel.

In a possible example, the first information is transmitted through a downlink control channel; and/or the first information is transmitted through a downlink shared channel.

When the processing unit 802 is a processor, the communication unit 803 is a communication interface, the storage unit 801 is a memory, and the network device involved in the embodiment of the present application may be the network device shown in FIG. 6.

Figure 9:
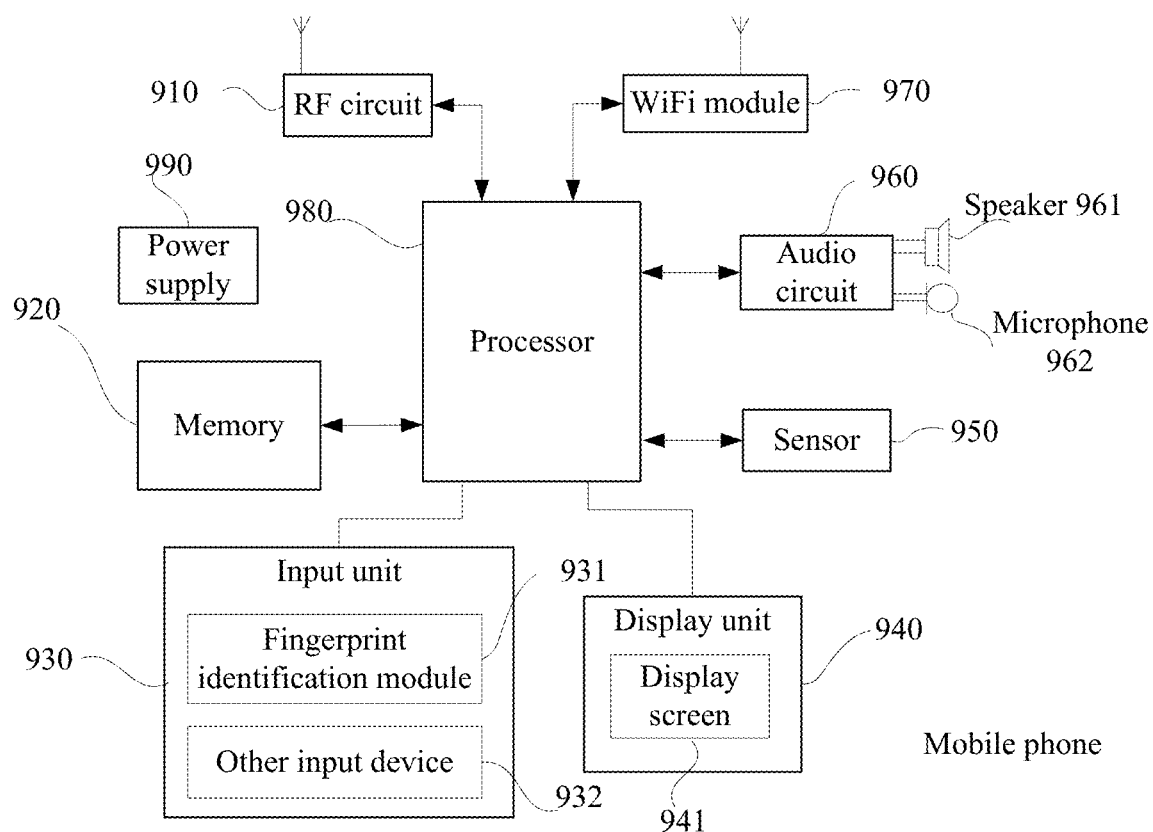
FIG. 9 is a schematic structural diagram of another terminal according to an embodiment of the present application.

The embodiment of the present application further provides another terminal. As shown in FIG. 9, for ease of description, only the part related to the embodiment of the present application is shown. Please refer to the method part of the embodiment of the present application for undisclosed specific technical details. The terminal may be any terminal device including a mobile phone, a tablet computer, a PDA (Personal Digital Assistant), a point of sales (POS) and a vehicle-mounted computer. Take the terminal as a mobile phone as an example:

FIG. 9 is a block diagram illustrating a partial structure of a mobile phone related to a terminal according to an embodiment of the present application. Referring to FIG. 9, the mobile phone includes components such as a radio frequency (RF) circuit 910, a memory 920, an input unit 930, a display unit 940, a sensor 950, an audio circuit 960, a wireless fidelity (WiFi) module 970, a processor 980 and a power supply 990. It will be understood by those skilled in the art that the structure of the mobile phone shown in FIG. 9 does not constitute a limitation to the handset, and may include more or less components than those illustrated, or some components or different components may be combined for arrangement. The following describes the components of the mobile phone in detail with reference to FIG. 9:

The RF circuit 910 can be used to receive and transmit information. Generally, the RF circuit 910 includes, but is not limited to, an antenna, at least one amplifier, a transceiver, a coupler, a low noise Amplifier (LNA), a duplexer and such. In addition, the RF circuitry 910 can also communicate with other devices via wireless communication and the network. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS) and such.

The memory 920 can be used to store software programs and modules, and the processor 980 executes various functional applications and data processing of the mobile phone by running software programs and modules stored in the memory 920. The memory 920 may mainly include a program storage area and a data storage area, where the program storage area may store an operating system, an application required for at least one function and such; the data storage area may store data created according to usage of the mobile phone and such. Moreover, the memory 920 can include high speed random access memory, and can also include a non-volatile memory, such as at least one magnetic disk storage device, flash memory device, or other volatile solid state storage devices.

The input unit 930 can be configured to receive input numeric or character information and to generate key signal inputs related to user settings and function controls of the mobile phone. Specifically, the input unit 930 can include a fingerprint identification module 931 and other input devices 932. The fingerprint identification module 931 can collect fingerprint data thereon of the user. In addition to the Fingerprint identification module 931, the input unit 930 may also include other input devices 932. Specifically, other input devices 932 may include, but are not limited to, one or more of a touch screen, a physical keyboard, function keys (such as volume control buttons, switch buttons, etc.), a trackball, a mice, a joystick and such.

The display unit 940 can be used to display information input by the user or information provided to the user as well as various menus of the mobile phone. The display unit 940 can include a display screen 941. In an embodiment, the display screen 941 can be configured in the form of a liquid crystal display (LCD), an organic light-emitting diode (OLED) and such. Although in FIG. 9, the Fingerprint identification module 931 and the display screen 941 implement the input and input functions of the mobile phone function as two separate components, in some embodiments, the Fingerprint identification module 931 and the display screen 941 can be integrated to achieve the input and playback functions of the mobile phone.

The mobile phone may also include at least one type of sensor 950, such as a light sensor, motion sensor, and other sensors. Specifically, the light sensor may include an ambient light sensor and a proximity sensor, where the ambient light sensor may adjust the brightness of the display screen 941 according to the brightness of the ambient light, and the proximity sensor may turn off the display screen 941 and/or backlight when the mobile phone moves to the ear. As a kind of motion sensor, the accelerometer sensor can detect the magnitude of acceleration in all directions (usually three axes), the magnitude and direction of gravity when it is stationary, and it can be used to identify mobile phone gesture applications (such as horizontal and vertical screens switching, related games, magnetometer attitude calibration), vibration recognition related functions (such as pedometer, tapping), etc.; gyroscopes, barometers, hygrometers, thermometers, infrared sensors and other sensors that can be provided for the mobile phone will not be repeated herein.

An audio circuit 960, a speaker 961, and a microphone 962 can provide an audio interface between the user and the mobile phone. The audio circuit 960 can transmit the converted electrical data of the received audio data to the speaker 961 for conversion to the sound signal for playing; on the other hand, the microphone 962 converts the collected sound signal into an electrical signal that is then received by the audio circuit 960 for conversion into audio data being played and processed afterwards by the processor 980, and being transmitted to the other mobile phone via the RF circuit 910, or the audio data are stored to the memory 920 for further processing.

WiFi is a short-range wireless transmission technology, and the mobile phone can help users to send and receive emails, browse web pages, and access streaming media through the WiFi module 970, which provides users with wireless broadband Internet access. Although FIG. 9 illustrates the WiFi module 970, it can be understood that it does not have to be a part of the mobile phone, and can be omitted as needed without changing the essence of the application.

The processor 980 is the control center of a mobile phone, which connects various portions of the entire mobile phone using various interfaces and lines, and executes various functions and processes data of the mobile phone by running or executing software programs and/or modules stored in the memory 920, and invoking data stored in the memory 920, so as to overall monitor the mobile phone. In an embodiment, the processor 980 may include one or more processing units; preferably, the processor 980 may integrate an application processor and a modem processor, where the application processor mainly processes an operating system, a user interface, an application and such, and the modem processor mainly process wireless communications. It will be appreciated that the modem processor described above may also not be integrated into the processor 980.

The mobile phone also includes a power supply 990 (such as a battery) that supplies power to various components. Preferably, the power source can be logically coupled to the processor 980 through a power management system, so as to manage functions such as charging, discharging, and power management through the power management system.

Although not shown, the mobile phone may further include a camera, a Bluetooth module and such, which will not be repeated herein.

In the above embodiments shown in FIG. 2 to FIG. 4, the process on the terminal side in each step method may be implemented based on the structure of the mobile phone.

In the above embodiments shown in FIG. 5 and FIG. 6, each unit function can be implemented based on the structure of the mobile phone.

The embodiment of the present application further provides a computer readable storage medium, where the computer readable storage medium stores a computer program for electronic data exchange, where the computer program enables the computer to perform some or all of the steps described by the terminal according to the above method embodiment.

The embodiment of the present application further provides a computer readable storage medium, where the computer readable storage medium stores a computer program for electronic data exchange, where the computer program enables the computer to perform some or all of the steps described by the network device according to the above method embodiment.

The embodiment of the present application further provides a computer program product, where the computer program product includes a non-transitory computer readable storage medium, the computer program is operative to enable the computer to perform some or all of the steps described by the terminal according to the above method embodiment. The computer program product can be a software installation package.

The embodiment of the present application further provides a computer program product, where the computer program product includes a non-transitory computer readable storage medium, the computer program is operative to enable the computer to perform some or all of the steps described by the network device according to the above method embodiment. The computer program product can be a software installation package.

The steps of the method or algorithm described in the embodiment of the present application may be implemented in a hardware form, or may be implemented in a form that a processor executes a software instruction. The software instruction may be composed of corresponding software modules that may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read only (CD-ROM) or any other form of storage medium known in the art. An exemplary storage medium is coupled to a processor so as to enable the processor to read information, and to write information to the storage medium. Certainly, the storage medium can also be a part of the processor. The processor and the storage medium can be located in an ASIC. In addition, the ASIC may be located in an access network device, a target network device or a core network device. Certainly, the processor and the storage medium may also exist as discrete components in the access network device, the target network device or the core network device.

Those skilled in the art should appreciate that in one or more of the above examples, the function described in the embodiments of the present application may be implemented whole or partially by software, hardware, firmware, or any combination thereof. When the function is implemented by software, it may be implemented in whole or partially in the form of a computer program product. The computer program product includes one or more computer instructions. When the computer program instructions are loaded and executed on a computer, the process or function described according to the embodiments of the present application are generated in whole or partially. The computer can be a general computer, a dedicated computer, a computer network or other programmable device. The computer instruction can be stored in a computer storage medium, or be transferred from one computer storage medium to another computer storage medium, for example, the computer instruction may perform carrying transmission from a website site, computer, server or data center in a wired manner (for example, a coaxial cable, fiber, digital subscriber line (DSL) or a wireless manner (for example, infrared, wireless, microwave, etc.) to another website, computer, server or data center. The computer storage medium can be any available media that can be accessed by a computer, or be a data storage device such as a server, a data center that includes one or more available media. The available medium may be a magnetic medium (for example, a floppy disk, a hard disk and a magnetic tape), an optical medium (for example, a digital video disc (DVD)), or a semiconductor medium (for example, a solid state disk (SSD)), etc.

The purpose, technical solution and beneficial effect of the embodiment of the present application have been described in detail in the above specific implementation forms. It should be understood that the above is only the specific implementation form of the embodiment of the present application, and is not used to limit the scope of protection of the embodiment of the application. Any modifications, equivalents, improvements, etc., which are obtained on the basis of the embodiments of the present application, are shall be included in the scope of the embodiments of the present application.

What is claimed is:

1. An activation method for a bandwidth part (BWP), comprising:
   receiving, by a terminal, first information from a network device on a first BWP in a first time unit, wherein the first information is used to activate a second BWP;
   transmitting, by the terminal, feedback response information corresponding to the first information in a second time unit;
   determining, by the terminal, a BWP that is activated after the second time unit; and
   wherein before the terminal transmits feedback response information corresponding to the first information in a second time unit, the method further comprises:
   receiving, by the terminal, second configuration information from the network device, and determining, by the terminal, the second time unit according to the second configuration information; or
   determining, by the terminal, the second time unit according to a second preset protocol.

2. The method according to claim 1, wherein the transmitting, by the terminal, feedback response information corresponding to the first information in a second time unit, comprises:
   transmitting, by the terminal, the feedback response information on the first BWP in the second time unit; or,
   transmitting, by the terminal, the feedback response information on the second BWP in the second time unit; or,
   transmitting, by the terminal, the feedback response information on a third BWP in the second time unit, wherein a downlink operation of the terminal in the first time unit is on the first BWP, and an uplink operation of the terminal in the first time unit is on the third BWP; or,
   transmitting, by the terminal, the feedback response information on a fourth BWP in the second time unit, wherein the second BWP is a full downlink resource, and the fourth BWP is an uplink resource paired with the second BWP; or,
   transmitting, by the terminal, the feedback response information on a fifth BWP in the second time unit, wherein the fifth BWP is used to transmit feedback response information transmitted by the terminal.

3. The method according to claim 2, wherein before the terminal determines to transmit feedback response information corresponding to the first information in a second time unit, the method further comprises:
   receiving, by the terminal, first configuration information from the network device; and
   determining, by the terminal, according to the first configuration information, a BWP that transmits the feedback response information.

4. The method according to claim 1, wherein the determining, by the terminal, a BWP that is activated after the second time unit, comprises:
   correctly receiving, by the terminal, the first information, and determining to perform at least one of data reception or data transmission on the second BWP after a target time period starting from the second time unit.

5. The method according to claim 4, wherein:
   duration of the target time period is configured by the network device; or,
   duration of the target time period is reported by the terminal; or, duration of the target time period is stipulated by a first preset protocol.

6. The method according to claim 4, wherein the feedback response information is transmitted on the second BWP or on a fourth BWP, and a value of duration of the target time period is zero.

7. The method according to claim 1, wherein the determining, by the terminal, a BWP that is activated after the second time unit, comprises:
incorrectly receiving, by the terminal, the first information, and determining to perform at least one of data reception or data transmission on a previously operating BWP after the second time unit, and the previously operating BWP is a BWP operating in the first time unit.

8. The method according to claim 1, wherein the feedback response information is transmitted through an independent uplink control channel.

9. A terminal, comprising: a processor, a memory and a communication interface, wherein:
the communication interface is configured to receive first information from a network device on a first bandwidth part (BWP) in a first time unit, wherein the first information is used to activate a second BWP; and transmit feedback response information corresponding to the first information in a second time unit;
the memory has executable instructions stored thereon that when executed by the processor cause the processor to: determine a BWP that is activated after the second time unit; and
wherein the communication interface is further configured to receive second configuration information from the network device, and the memory has executable instructions stored thereon that when executed by the processor cause the processor to determine the second time unit according to the second configuration information; or
the memory has executable instructions stored thereon that when executed by the processor cause the processor to determine the second time unit according to a second preset protocol.

10. The terminal according to claim 9, wherein the communication interface is further configured to:
transmit the feedback response information on the first BWP in the second time unit; or,
transmit the feedback response information on the second BWP in the second time unit; or,
transmit the feedback response information on a third BWP in the second time unit, wherein a downlink operation of the terminal in the first time unit is on the first BWP, and an uplink operation of the terminal in the first time unit is on the third BWP; or,
transmit the feedback response information on a fourth BWP in the second time unit, wherein the second BWP is a full downlink resource, and the fourth BWP is an uplink resource paired with the second BWP; or,
transmit the feedback response information on a fifth BWP in the second time unit, wherein the fifth BWP is used to transmit feedback response information transmitted by the terminal.

11. The terminal according to claim 10, wherein the communication interface is configured to:

receive first configuration information from the network device; and
the memory has executable instructions stored thereon that when executed by the processor cause the processor to: determine, according to the first configuration information, a BWP that transmits the feedback response information.

12. The terminal according to claim 9, wherein the communication interface is configured to:
correctly receive the first information, and
the memory has executable instructions stored thereon that when executed by the processor cause the processor to: determine to perform at least one of data reception or data transmission on the second BWP after a target time period starting from the second time unit.

13. The terminal according to claim 12, wherein:
duration of the target time period is configured by the network device; or,
duration of the target time period is reported by the terminal; or,
duration of the target time period is stipulated by a first preset protocol.

14. The terminal according to claim 12, wherein the feedback response information is transmitted on the second BWP or on a fourth BWP, and a value of duration of the target time period is zero.

15. The terminal according to claim 9, wherein the communication interface is configured to:
incorrectly receive the first information, and
the memory has executable instructions stored thereon that when executed by the processor cause the processor to: determine to perform at least one of data reception or data transmission on a previously operating BWP after the second time unit, and the previously operating BWP is a BWP operating in the first time unit.

16. The terminal according to claim 9, wherein the feedback response information is transmitted through an independent uplink control channel.

17. The terminal according to claim 9, wherein the first information is transmitted through at least one of a downlink control channel or a downlink shared channel.

18. A non-transitory computer readable storage medium, storing a computer program for electronic data exchange, wherein the computer program enables a computer to perform:
receive first information from a network device on a first bandwidth part (BWP) in a first time unit, wherein the first information is used to activate a second BWP;
transmit feedback response information corresponding to the first information in a second time unit;
determine a BWP that is activated after the second time unit; and
wherein before the terminal transmits feedback response information corresponding to the first information in a second time unit, the computer is further enabled to perform:
receive second configuration information from the network device, and determine the second time unit according to the second configuration information; or
determine the second time unit according to a second preset protocol.

* * * * *